United States Patent Office 2,871,895
Patented Feb. 3, 1959

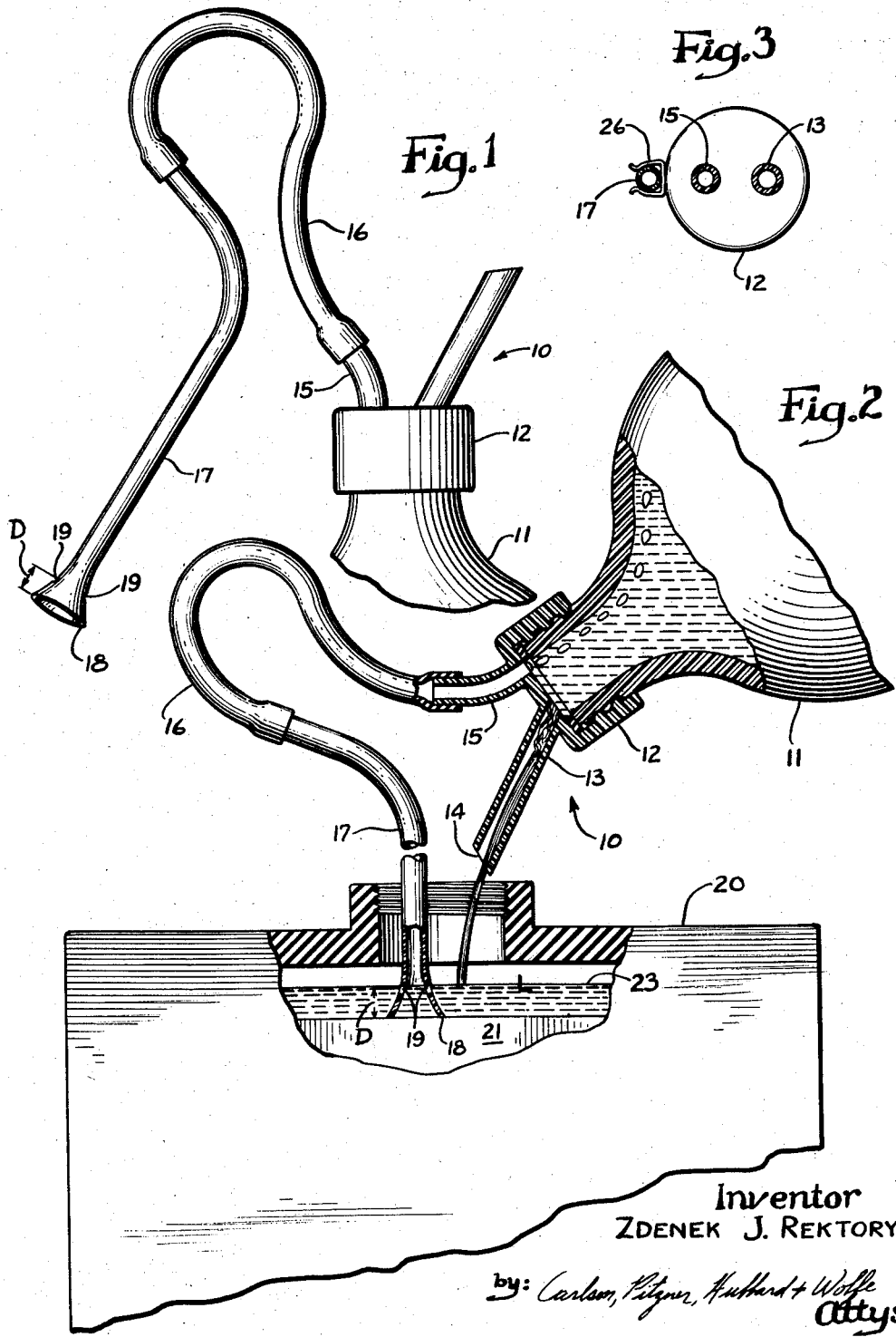

2,871,895

LIQUID FILLING DEVICE

Zdenek J. Rektorys, Chicago, Ill.

Application May 24, 1956, Serial No. 587,033

4 Claims. (Cl. 141—290)

This invention relates generally to liquid filling devices and more particularly to a device for filling storage batteries to a predetermined level.

The common storage battery, used in automobiles and the like, requires a liquid electrolyte in sufficient quantity to submerge the battery plates. This liquid is subject to evaporation and therefore must be replenished at regular intervals. The openings to the battery cells are small, and in many automotive installations, difficult to reach so as to visually determine the amount of liquid required to bring the level to the correct point above the plates. Moreover, when liquid is being supplied to the cells visual observation of the liquid level is even more obscured by the supplying container so that the filling operation becomes a sequence of "pour and look" steps. It is therefore desirable to be able to conveniently and accurately gauge the amount of liquid needed to replenish a storage battery and to automatically stop the flow of liquid into the battery when that amount has been supplied. Failure to add enough liquid may cause a cell to run dry, running the risk of battery failure. Failure to stop the flow in time, as for example when in a hurry, results in flooding the battery, metal battery holder, and surrounding parts with corrosive electrolyte.

Accordingly it is an object of the invention to provide a novel battery filling device that will permit a battery to be quickly and accurately filled to a predetermined liquid level above the battery plates. It is a collateral object to provide a filling device that will automatically stop the flow of liquid at a desired point so that the operator is not required to estimate or judge the amount to be supplied.

It is a further object to provide a battery filling device that is not only accurate and automatic but which requires no change in the battery structure so that the device can be universally utilized with the storage batteries in common use.

It is finally an object to provide a battery filling device that is extremely simple, practically foolproof, and inexpensive to manufacture.

Other objects and advantages of the invention will become apparent upon reading the following detailed discussion and upon reference to the attached drawings in which:

Figure 1 is a perspective view of the filling device mounted on a vessel.

Fig. 2 is a partial section view showing the device of Fig. 1 being used to fill a storage battery.

Fig. 3 is a top view of a modified stopper including a clip for holding the nozzle when not in use.

While the invention will be described in connection with a preferred embodiment, it will be understood that I do not intend to limit the invention to that embodiment but, on the contrary intend to cover such alternative embodiments and constructions as may be included within the spirit and scope of the appended claims.

Turning now to Figs. 1 and 2 there is shown the filling device 10 constructed according to the invention mounted on a bottle or other closed vessel 11. The device includes a stopper 12 having a pouring spout 13, the stopper having suitable screw threads and a gasket to effect a liquid tight seal at the neck of the vessel. The spout 13 is fairly short and has a tapered pouring lip 14 from which the liquid may be accurately poured when the vessel is up-ended. So that air may enter the closed container and replace liquid that is being poured from the spout, an air inlet is provided in the stopper. In the preferred embodiment the air inlet takes the form of a short length of tube 15 extending through the stopper.

In accordance with the present invention a flexible length of tubing is provided extending from the air inlet opening and terminating in a nozzle having a breather opening and having means for positively spacing the opening a predetermined distance above battery plates or other bodies requiring submergence. In the present embodiment a length of flexible rubber or plastic hose 16 is fitted over the end of the tube 15 to form an air and liquid-tight connection. Similarly fitted into the other end of hose 16 is a nozzle 17 formed of a length of rigid plastic tubing. The open end 18 of nozzle 17 is flared outwardly so that the rim of the nozzle forms a flat, broad supporting surface. Spaced a distance D along the nozzle from its end 18 are breather ports consisting of two openings 19 formed in the wall of the nozzle. The distance D corresponds to the depth to which it is desired to submerge the battery plates, and it can be any convenient amount. In the present embodiment the nozzle 17 is generally L-shaped since the short leg of the L provides a convenient handle for positioning the nozzle, although this configuration can obviously be varied without departing from the invention. While two breather ports 19 are provided, one on each side of the nozzle, as shown, this number and their circumferential spacing can be modified within the scope of the invention. The length of tubing 16 is also a matter of convenience.

The operation of the device is clearly shown in Fig. 2. The battery 20 is opened and the nozzle is inserted through the opening with its flared flat end 18 positioned on the top of the battery plates 21. As is apparent, the reason for forming end 18 into a broad supporting surface is that such design permits quick and steady placement of the tube on the spaced battery plates without care on the part of the operator and without danger that the end of the nozzle will slip between the plates. The extensive flared supporting surface insures flat seating with no tendency toward rocking, thus insuring accurate spacing of the openings 19 above the plates.

As the tube 17 is held in position the vessel 11 is inverted and liquid is poured into the battery 20 through spout 13. The liquid leaving the vessel is replaced by air entering the air access openings 19 in the nozzle. When the liquid level 23 in the battery rises to cover the air access openings 19 the liquid can no longer flow through the restricted opening formed by the spout 13. This is true because the partial vacuum formed in the closed vessel 11 by the departing liquid is not relieved by air entering the openings 19 and the greater outside air pressure arrests the liquid flow from the spout.

As shown in Fig. 3, a clip 26 may be provided on the cap 12 on which the nozzle may be conveniently clipped when not in use. The assembly shown, but not including the bottle 11 may be sold as a unit, with a standard thread for attachment to the customer's bottle.

The passage of bubbles through the liquid signals to the operator that liquid is flowing. When the bubbles stop the operator knows that the liquid in the cell is above the rated level, and this is a signal that he can move on to the next cell without delay. Thus the whole process consumes a minimum of time. Even if the operator's attention should be diverted, there is no danger of overflow since cutoff is automatic. Anyone can use the device without any special instruction or training.

I claim as my invention:

1. A filling device comprising a closure adapted to seal a portable vessel, a rigid pouring spout in said closure permitting liquid to be poured therethrough upon tilting of the vessel, means defining an air access opening in said closure, a flexible tube extending from said opening and terminating in a rigid nozzle having a breather port at the end thereof, said flexible tube and said spout being independent and unconnected with the tube being substantially longer than the spout, and means on said nozzle for engaging a submergible body to support said port at a predetermined level above the point of engagement, so that entry of air through said port incident to pouring liquid from said spout is cut off by the liquid rising to said predetermined level said rigid nozzle being elongated for providing a convenient gripping portion permitting the nozzle to be easily positioned with said means engaging said body.

2. A filling device comprising a closure adapted to seal a portable vessel, a rigid pouring spout in said closure permitting liquid to be poured therethrough upon tilting of said vessel, means defining an air access opening in said closure, a flexible tube extending from said opening and terminating in a rigid tubular nozzle having at least one breather port spaced from its end, said flexible tube and said spout being independent and unconnected with the tube being substantially longer than the spout, said nozzle end being outwardly flared to define a flat extensive surface for engaging a submergible body to support said port at a predetermined level above the point of engagement, so that entry of air through said port incident to pouring liquid from said spout is cut off by the liquid rising to said predetermined level.

3. A filling device for attachment to a portable vessel comprising, in combination, a closure adapted to seal said vessel, a rigid pouring spout in said closure permitting liquid to be poured from the vessel upon tilting the latter, said closure having an air access opening, and a flexible tube extending from said opening and terminating in a rigid nozzle, said flexible tube and said spout being independent and unconnected with the tube being substantially longer than the spout, said nozzle having a breather port and means to engage a submersible body for supporting said port at a predetermined level above said body, said rigid nozzle also having a gripping portion permitting said means to be quickly and firmly located on said body so that entry of air through said port to the vessel incident to pouring liquid from said port will be prevented by the liquid rising to said level thereby cutting off the flow of liquid from the vessel.

4. A filling device for attachment to a portable vessel comprising in combination, a closure adapted to seal said vessel, a rigid pouring spout in said closure permitting liquid to be poured from the vessel upon tilting the latter, said closure having an air intake opening spaced from said spout, and a flexible tube extending from said opening and terminating in an elongated, rigid nozzle, said flexible tube and said spout being independent and unconnected with the tube being substantially longer than the spout, said nozzle having a flared end and a breather port spaced from said end, said nozzle also being bent into a generally L-shaped configuration so that the elongated L-shaped nozzle can be conveniently gripped and its flared end flatly engaged with a submersible body so as to position said port at a predetermined level above the point of engagement.

References Cited in the file of this patent

UNITED STATES PATENTS

| | | |
|---|---|---|
| 773,457 | Barton | Oct. 25, 1904 |
| 1,712,470 | Pray | May 7, 1929 |
| 2,615,607 | Huskey | Oct. 28, 1952 |
| 2,666,557 | Hester | Jan. 19, 1954 |

FOREIGN PATENTS

| | | |
|---|---|---|
| 324,196 | France | Dec. 5, 1902 |